(12) United States Patent
Kim et al.

(10) Patent No.: US 9,485,288 B2
(45) Date of Patent: Nov. 1, 2016

(54) PEER-TO-PEER COMMUNICATION METHOD IN CONTENT CENTRIC NETWORK ENVIRONMENT

(71) Applicant: RESEARCH & BUSINESS FOUNDATION SUNGKYUNKWAN UNIVERSITY, Suwon-si (KR)

(72) Inventors: Yusung Kim, Suwon-si (KR); Younghoon Kim, Seoul (KR); Ikjun Yeom, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 215 days.

(21) Appl. No.: 14/097,354

(22) Filed: Dec. 5, 2013

(65) Prior Publication Data

US 2014/0172981 A1  Jun. 19, 2014

(30) Foreign Application Priority Data

Dec. 13, 2012  (KR) .................... 10-2012-0145043

(51) Int. Cl.
| | |
|---|---|
| *H04L 29/06* | (2006.01) |
| *H04L 29/08* | (2006.01) |
| *H04L 12/761* | (2013.01) |
| *H04L 12/18* | (2006.01) |

(52) U.S. Cl.
CPC .......... *H04L 65/4084* (2013.01); *H04L 45/16* (2013.01); *H04L 67/104* (2013.01); *H04L 12/1886* (2013.01); *H04L 67/1046* (2013.01)

(58) Field of Classification Search
CPC ... H04L 29/06; H04L 67/2842; H04L 45/16; H04L 12/1886; H04L 67/1046; H04L 67/104; H04L 65/4084

USPC ............................................... 370/389, 395.3
See application file for complete search history.

(56) References Cited

U.S. PATENT DOCUMENTS

| | | | | |
|---|---|---|---|---|
| 7,360,084 B1* | 4/2008 | Hardjono | ............... | H04L 12/185 380/42 |
| 2003/0123419 A1* | 7/2003 | Rangnekar | .............. | H04L 45/02 370/338 |
| 2009/0288163 A1* | 11/2009 | Jacobson | ............... | G06F 15/173 726/22 |
| 2010/0195655 A1* | 8/2010 | Jacobson | ............... | H04L 45/748 370/392 |
| 2012/0317307 A1* | 12/2012 | Ravindran | .......... | H04L 12/6418 709/238 |
| 2013/0029664 A1* | 1/2013 | Lee | ........................ | H04L 67/32 455/435.1 |
| 2013/0060962 A1* | 3/2013 | Wang | .................... | H04L 67/327 709/238 |

* cited by examiner

*Primary Examiner* — Chris Parry
*Assistant Examiner* — Stephen Houlihan
(74) *Attorney, Agent, or Firm* — NSIP Law

(57) ABSTRACT

There is provided a peer-to-peer communication method in a content centric network environment. In embodiments, the peer-to-peer communication method in a content centric network (hereinafter referred to as a "CCN") environment includes, receiving, by a CCN router, a join message including a desired service name of a user node from the user node, transmitting, by the CCN router, the join message to a rendezvous point mapped to the service name and forming a share tree, receiving, by the CCN router, a content request message including a name of content that is provided through the service from the user node, and transmitting, by the CCN router, the content request message through an interface connected to the share tree.

14 Claims, 6 Drawing Sheets

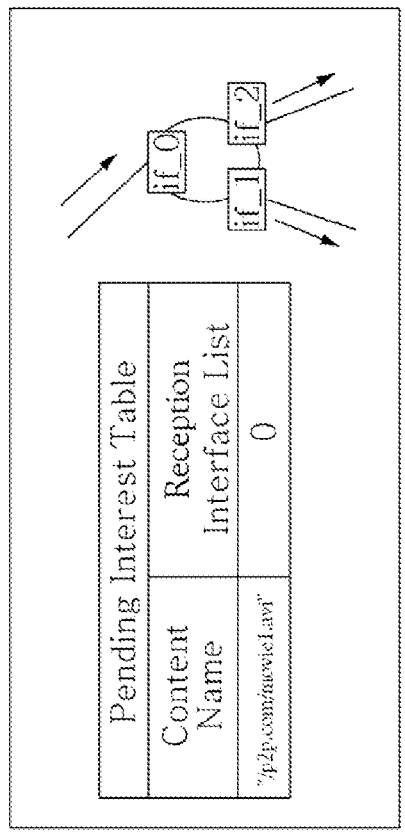
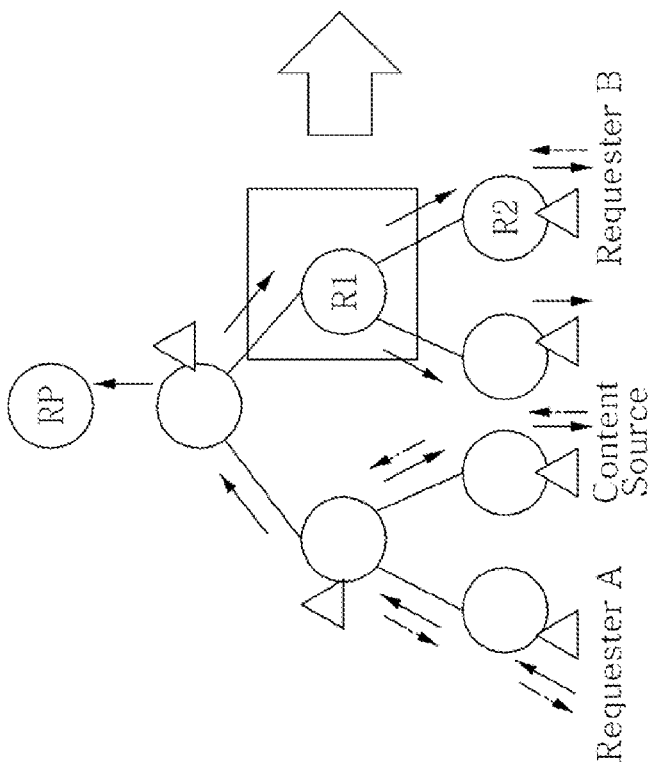
FIG. 4B
FIG. 4A

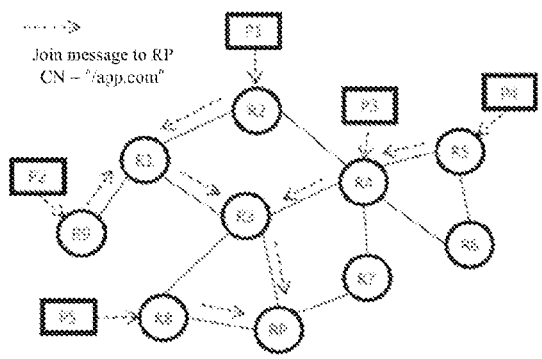
FIG. 6A The flow of join message
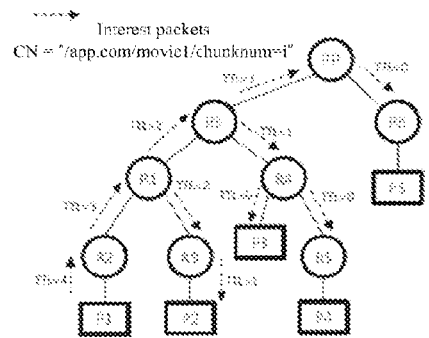
FIG. 6B Interest forwarding in a discovery phase
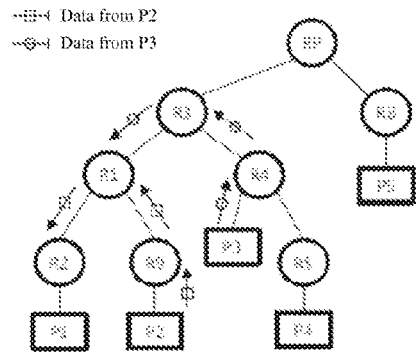
FIG. 6C Data response
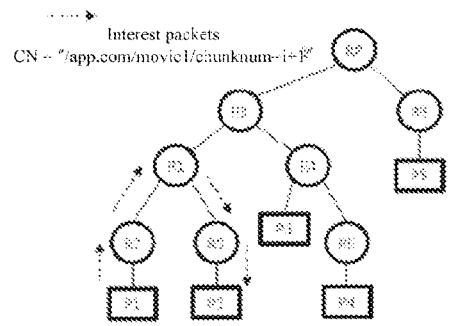
FIG. 6D Interest forwarding in a data retrieval phase

PEER-TO-PEER COMMUNICATION METHOD IN CONTENT CENTRIC NETWORK ENVIRONMENT

CROSS-REFERENCE TO RELATED APPLICATION

This application claims priority to Korean Patent Application No. 2012-0145043 filed on Dec. 13, 2012 in the Korean Intellectual Property Office (KIPO), the entire contents of which are hereby incorporated by reference.

BACKGROUND

1. Field

The present disclosure relates to a peer-to-peer communication method in a content centric network environment.

2. Description of Related Art

A current host-based Internet structure has limitations in terms of scalability, security, and network flexibility. In order to overcome these limitations, next Internet, in particular, research on content centric network (hereinafter referred to as a "CCN") has been actively underway. In a current Internet transmission method, an Internet protocol (IP) address of a sending/receiving host is used to provide services and as much the same data as the number of users is repeatedly transmitted, which results in inefficiency. On the other hand, a CCN uses a content name instead of the IP address to distribute data over the network and thus it is possible to provide a rapid service without repeated transmission of the same data.

FIG. 1 is a diagram illustrating a fundamental operation of the CCN. In the CCN that has been drawing attention recently, it is possible to essentially distribute content using an one-to-many multicast method. Therefore, an efficient content request and distribution is performed when a content source is known. Hereinafter, a content request and distribution method in the CCN will be described with reference to FIG. 1. First, a user transmits a content request message (for example, an interest packet) toward a CCN router using a name of desired content. The CCN router includes a pending interest table (hereinafter referred to as a "PIT"), a content store (CS), and a forwarding information base (FIB) module. The PIT guides interest aggregation and a content data delivery path. When the CCN router receives content data, the CS stores the content data as a cache. The FIB functions as a routing table that is used to determine an interface for delivering a packet from the content name.

The CCN router checks a content name in an interest packet and delivers the interest packet to a source direction of corresponding content. In this case, the CCN router delivers an interest packet of the same content once upward for a predetermined time, and then adds only information on an interface in which the interest packet is received to the PIT. That is, as illustrated in FIG. 1A, when a plurality of users request the same popular content at the same time, routers (R3, R5, R6, R1, R2, and R0) included in the CCN deliver the interest packet only once toward a content server (YouTube). When the interest packet is delivered to the content server, the content server distributes the content reversely to a path from which the interest packet is delivered, as illustrated in FIG. 1B. Since the CCN router stores information on the interface in which the interest packet is received in the PIT, it is possible to deliver data to all interfaces in which the interest packet is received with reference to the PIT when corresponding content data is received. Therefore, in the CCN, it is possible to request and receive data using only a desired content name through the PIT without exchanging location information of source and destination nodes as in an IP network. In addition, the CCN router copies the data in a content storage, and thus it is possible to provide a data service immediately upon receiving a re-request later.

SUMMARY

In one general aspect, there is provided a peer-to-peer communication method in a content centric network (hereinafter referred to as a CCN) environment. The method include receiving, by a CCN router, a join message including a desired service name from the user node, transmitting, by the CCN router, the join message to a rendezvous point mapped to the service name and forming a share tree, receiving, by the CCN router, a content request message including a name of content that is provided through the service from the user node, and transmitting, by the CCN router, the content request message through an interface connected to the share tree.

In another general aspect, there is provided a peer-to-peer communication method in a content centric network (hereinafter referred to as a "CCN") environment. The method includes receiving, by a CCN router, a content request message including a desired content name from the user node, determining whether the CCN router transmits the content request message based on a transmission interface list corresponding to the content name, and adding an interface from which the content request message is transmitted to a transmission interface list corresponding to the content name when the CCN router receives the content request message.

In yet another general aspect, there is provided a peer-to-peer communication method in a content centric network (hereinafter referred to as a "CCN") environment. The method includes, transmitting, by a user, a content request message including a content name, determining whether a CCN router transmits a corresponding content request message based on a time-to-live (TTL) value of the request message, and retransmitting the message by increasing the TTL value when the user does not receive a response within a certain time.

According to a fourth aspect of the present disclosure, there is provided a communication method. The method includes, receiving, by a CCN router, a content request message including a desired content name from the user node, determining whether the CCN router transmits the content request message to which of interfaces based on an FIB or Peer-aware FIB (PAFIB) entry corresponding to the content name, and adding or modifying the FIB (or PAFIB) entry when the CCN router receives response data for the content request message.

BRIEF DESCRIPTION OF DRAWINGS

FIGS. 4A and 4B are diagrams illustrating an example of a problem occurring when an interest aggregation scheme is applied to a communication method according to the present disclosure.

FIGS. 6A-6D are diagrams illustrating an example of a peer-to-peer communication method in a CCN environment according to another embodiment of the present disclosure.

Figures 1A, 1B:
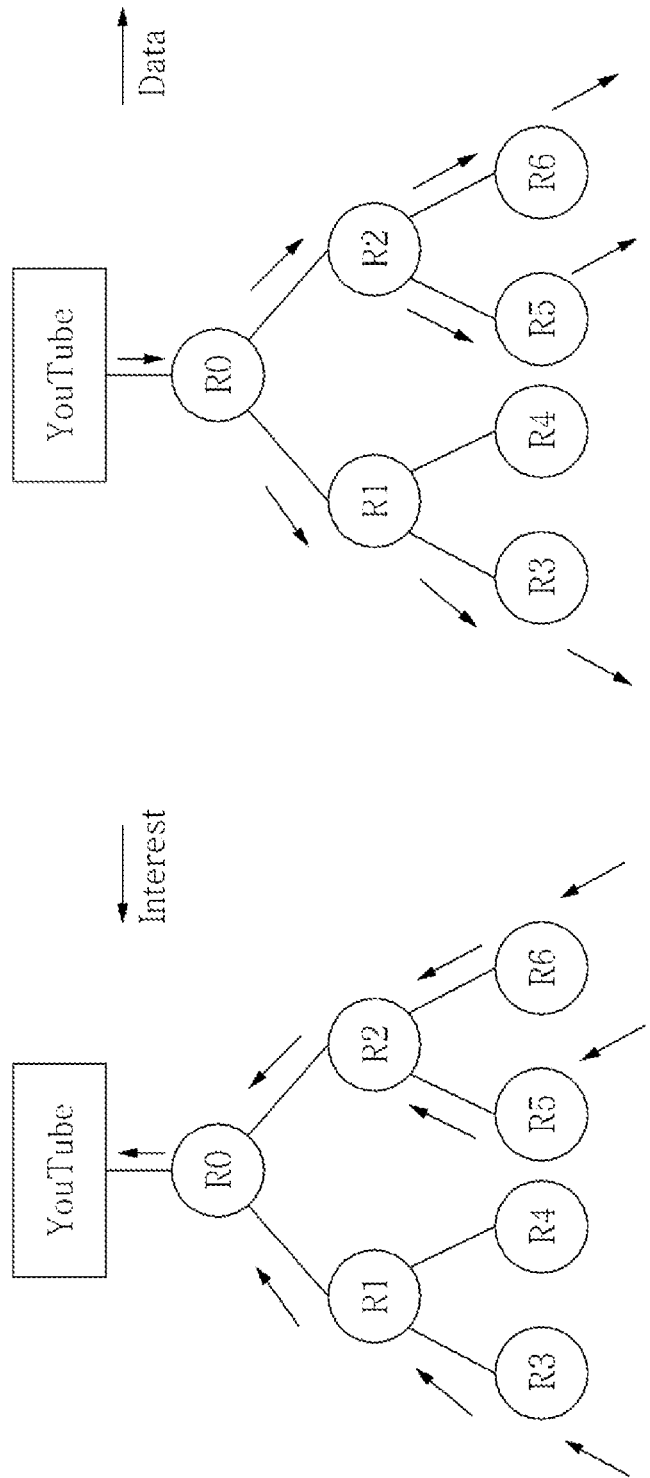
FIGS. 1A and 1B are diagrams illustrating an example of a fundamental operation of a CCN.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION OF EXAMPLE EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, and/or components thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

Figure 2:
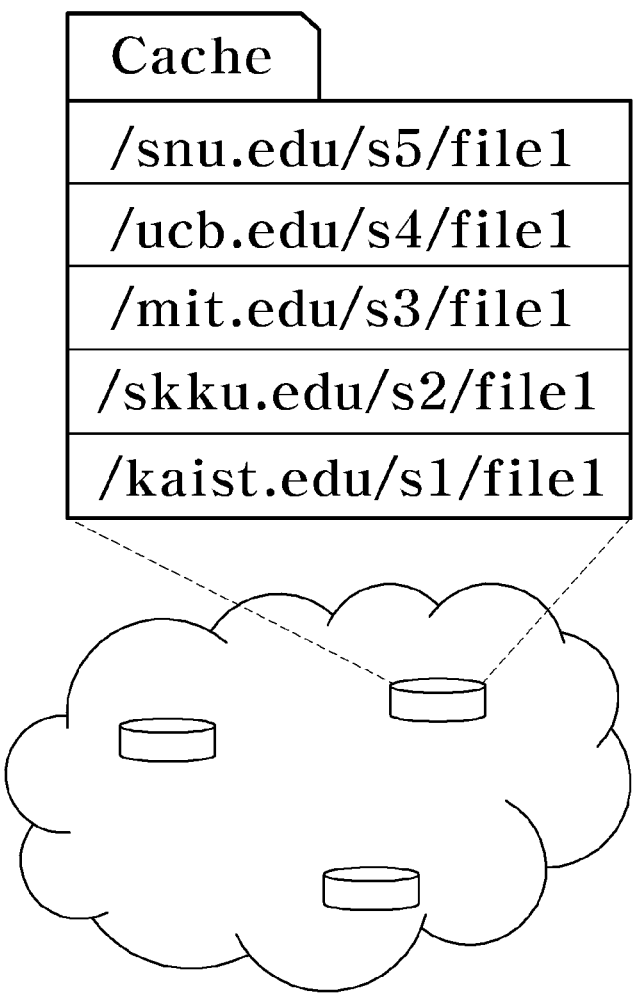
FIG. 2 is a diagram illustrating an example of a redundant content storing problem in a CCN router cache when peer-to-peer communication is applied to a conventional peer-to-peer method in an overlay fashion of the current Internet.

BitTorrent, a currently representative P2P file sharing system in the Internet, includes a server named a tracker, and all users register information on their own files and their own addresses (IP address). When a query for a specific file is received, the tracker provides an address list of users who hold a corresponding file. In a file sharing method in such an application layer level, since a content name is composed of a network prefix and a file name, there is a problem in that the same content has a different content name for each provider. FIG. 2 is a diagram illustrating an example of a redundant content storing problem in a CCN router cache. As illustrated in FIG. 2, when the same content data of "file1" is received from different providers, the data is stored redundantly in a network cache with a different content name due to a different network prefix. In the CCN, since a content request, routing, network cache, content distribution, or the like are performed using the content name, the content name is important for an efficient CCN operation. A current content name has a hierarchical structure and a longest prefix match is used. As illustrated in FIG. 2, when the same content is located in a different network, since the content name differs, the content is regarded as different content and thus may be redundantly stored in the network cache. In addition, the file sharing method in the application layer level has problems in that costs for building a server such as the tracker are necessary, traffic is concentrated on the server, and a file requester may have a difficulty in efficiently selecting a provider using only a file provider list.

Hereinafter, the present disclosure provides a peer-to-peer communication method that does not require a centralized server to manage the mapping information between content names and peer locations. In the present disclosure, similar to an IP multicast, a share tree is generated around an RP but there are differences as follows. In the IP multicast, when nodes included in a tree with a push-based structure transmit packets, the packets are delivered to the RP, and the RP distributes the packets. Since a route looping problem may occur in an IP network, it is necessary to apply a reverse path forwarding (RPF) scheme and thus the packet is always distributed through the RP. On the other hand, the route looping problem does not occur in the CCN. Therefore, the CCN router, that has received an interest packet or held requested content, distributes the packet directly in the present disclosure. According to the present disclosure, it is possible to provide more efficient peer-to-peer communication than a conventional IP multicast method or a CCN method in which a peer-to-peer model is applied in an application layer. In the present disclosure, the content name is independent of peer locations, and it enables that the same name is used for the same content, thus network cache efficiency increases. In addition, content is received from the nearest location according to a tree generated for communication.

Figure 3:
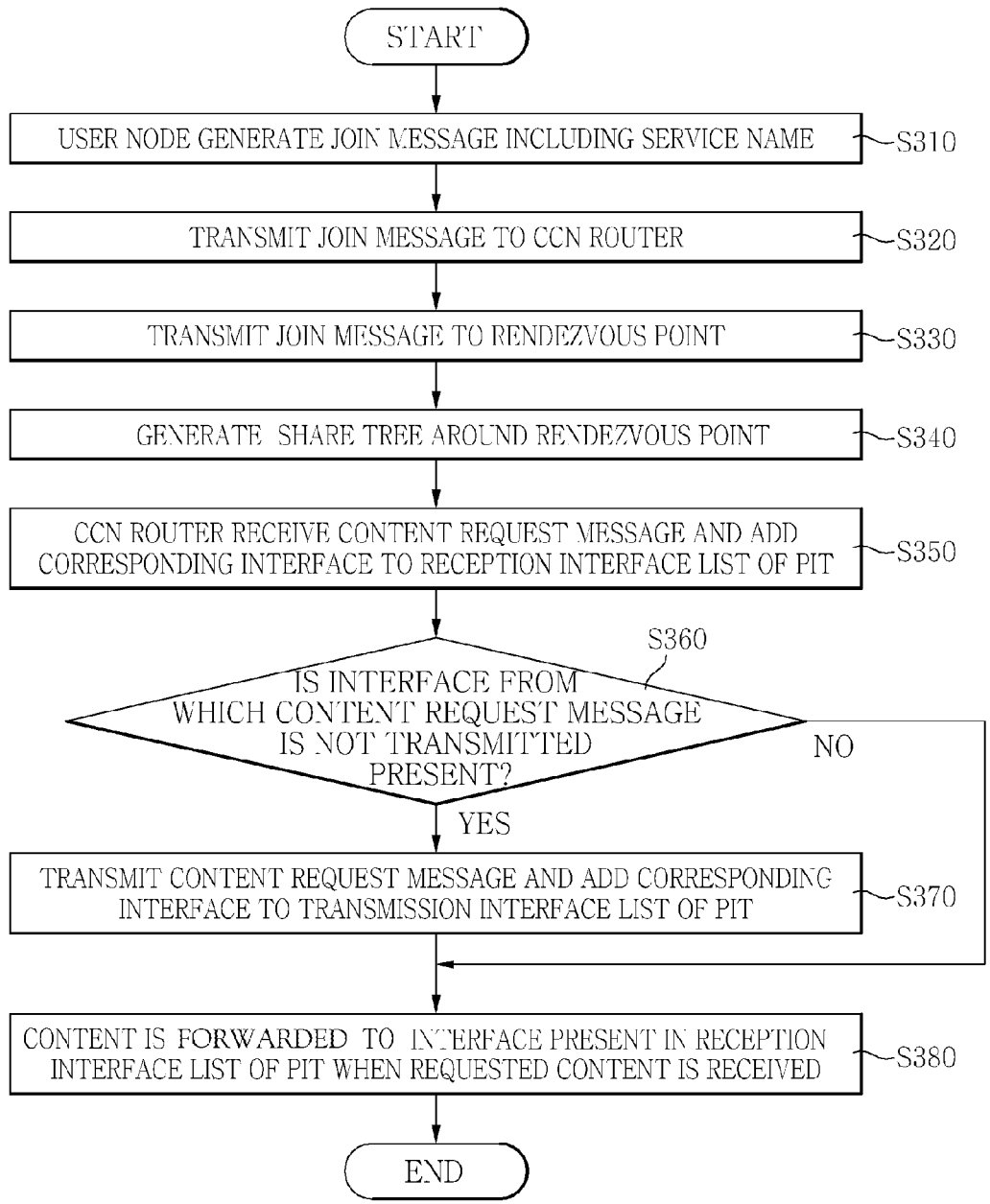
FIG. 3 is a flowchart illustrating an example of a peer-to-peer communication method in a CCN environment according to an embodiment of the present disclosure.

FIG. 3 is a flowchart illustrating an example of a peer-to-peer communication method in a CCN environment according to an embodiment of the present disclosure. According to the present disclosure, in order to perform communication between user nodes that subscribe and unsubscribe dynamically, the user nodes generate a tree around a rendezvous point (RP) through S310 to S340.

In S310, the user node generates a join message including a desired service name. For example, when the user wants to receive a P2P service provided from "p2p.com," the user node generates a join message including "/p2p.com." In S320, the user node transmits the generated join message to a router.

Meanwhile, depending on embodiments, the user node may generate a content name including a service name and a file name. For example, the user node may generate a content name of "/p2p.com/movie1.avi" by combining a service name provided for the user of "p2p.com" and a file name of "movie1.avi." Since the content name is generated by combining the service name and the file name, the same content may have the same content name in the same service. According to the present disclosure, the same content name is used to search, store, or distribute for the same content, and thus it is possible to maintain efficiency of the CCN.

In S330, the router transmits a join message to a rendezvous point mapped to a corresponding service name. For example, when the received join message includes a service name of "/p2p.com," the router transmits a join message to a rendezvous point mapped to "p2p.com." The rendezvous point may be designated in a static or may be designated by a separate dynamic algorithm. According to the embodiment of the present disclosure, the router may use a modified conventional FIB module or may further include a separate peer-aware forwarding information base (hereinafter referred to as a "PAFIB") module. The modified FIB or the PAFIB may store information on an interface in which the join message is received and information on an interface from which the join message is transmitted to the rendezvous point. For example, the PAFIB generates an entry according to a service name and may store interface information connected to a tree that is composed for a corresponding service for each entry.

In S340, user nodes generate a share tree having a rendezvous point as a root. The user node included in the share tree may distribute (flooding) a content request message (for example, an interest packet) for desired content to other user node through the tree.

Meanwhile, in order to prevent the same interest packet from repeatedly flooding in the CCN, an interest aggregation scheme in which, when the CCN router repeatedly receives the same interest for a certain time, does not deliver the same interest to the nearby and maintains only received interface information in a pending interest table (PIT) may be used. However, when a conventional interest aggregation scheme, that is appropriate for a server-client model CCN, is directly applied to the present disclosure, there is a problem in that a data packet is not delivered to a user node that requests the packet in some cases.

FIGS. 4A and 4B are diagrams illustrating an example of a problem occurring when the interest aggregation scheme is applied to a communication method according to the present disclosure. FIG. 4A illustrates a flow of interest packets that are sent from a first requester (Requester A) and a second requester (Requester B) in a tree formed around a rendezvous point RP. First, the first requester sends an interest packet for desired content. The interest packet is forwarded along the tree until corresponding content is found. A CCN router R1 that has received the interest packet sent from the first requester updates a pending interest table (PIT) as illustrated in FIG. 4B. For example, when R1 receives an interest packet for requesting content of "manual.txt" from an interface of "0" (if_0), records the interface of "0" in which the interest packet is received in the PIT and delivers the interest packet to other two interfaces (if_1 and if_2). Then, when the second requester desires the same content as the first requester, the second requester transmits the same interest packet as the first requester to an immediate-front router R2. Since the interest packet of the same content name is already present in the PIT table, the router R2 only adds interface information in which the interest packet is received and does not transmit the interest packet to the nearby according to an interest aggregation policy. Meanwhile, when a data packet of corresponding content is received later, the routers deliver the data packet to all interfaces in which the interest packet is received with reference to the PIT. However, since the data packet is only delivered reversely to a path through which the interest packet passed in the CCN, the data packet is delivered to only the Requester A serving as the first requester in FIG. 4A. Since the data packet is not delivered to R2, there is a problem in that the Requester B serving as the second requester does not receive the data packet.

In order to address such a problem of the interest aggregation, in the present disclosure, both a reception interface in which the interest packet is received and a transmission interface from which the interest packet is transmitted are stored in the PIT. It is determined whether the interest packet is delivered based on the stored interfaces.

Figure 5B:
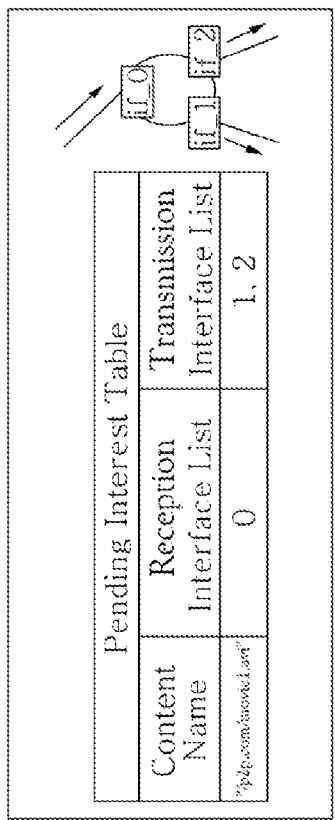
FIGS. 5A-5C are diagrams illustrating an example of a modified interest aggregation scheme according to the present disclosure.
Figure 5C:
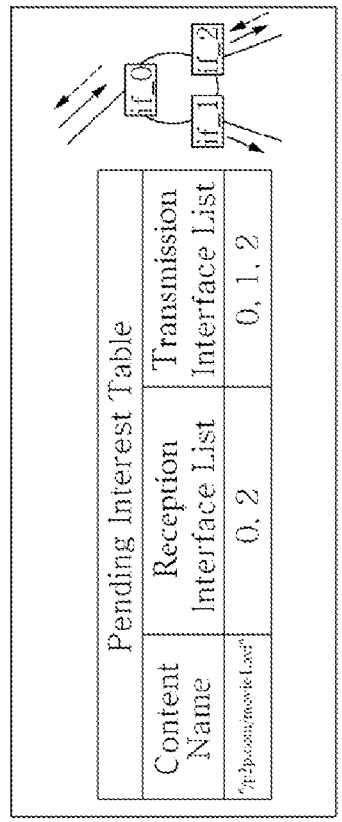
Figure 5A:
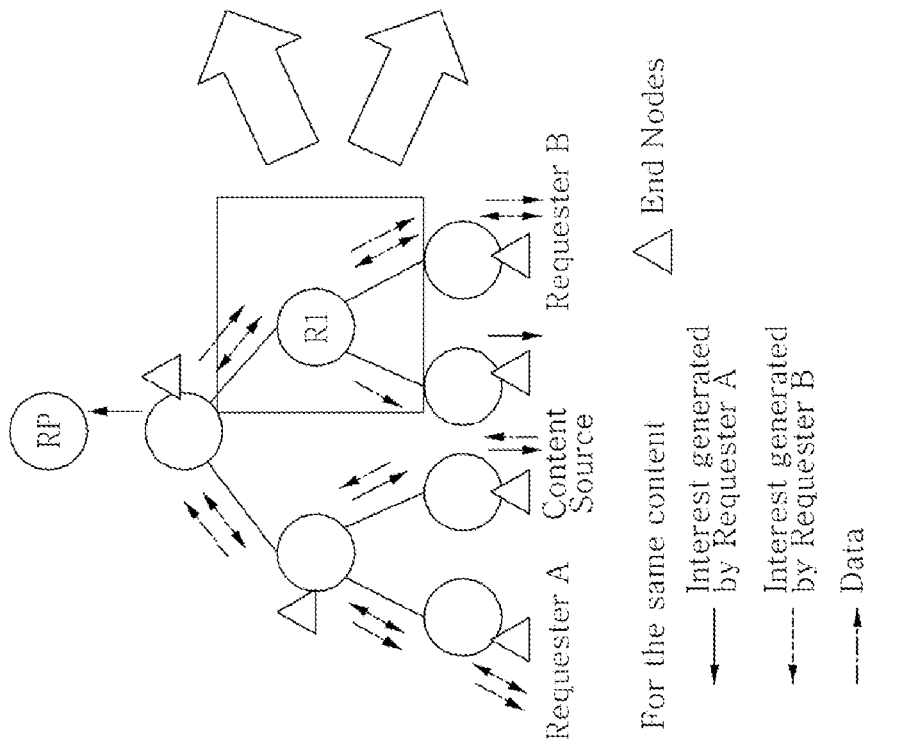

FIGS. 5A-5C are diagrams illustrating an example of a modified interest aggregation scheme according to the present disclosure. First, when the first requester (Requester A) transmits the interest packet, the interest packet is forwarded along the tree the same as that in FIGS. 4A-4B. The CCN router R1 that has received the interest packet transmitted from the first requester updates the pending interest table (PIT) as illustrated in FIG. 5B. Only the reception interface information is stored in the conventional PIT. However, according to the modified interest aggregation scheme newly proposed in the present disclosure, the CCN router stores both of the reception interface information and the interface information from which the interest packet is transmitted in the PIT. R1 in FIG. 5A stores information on the interface of "0" in which the interest packet is received and information on the interfaces of "1" and "2" from which the interest packet is transmitted.

Then, when the second requester (Requester B) transmits the interest packet for the same content, unlike that in FIGS. 4A-4B, the interest packet is forwarded according to the modified interest aggregation scheme. According to the modified interest aggregation scheme, even when the interest packet of the same content name is received within a certain time but an interface from which the interest packet is not yet transmitted is present, the CCN router transmits the interest packet. In addition, interface information from which the interest packet is transmitted is added to the PIT so that the interest packet for the same content is not repeatedly transmitted through the same interface. Then, when all interfaces capable of transmitting R1 were used to transmit the interest packet for the content, the interest packet is not transmitted anymore for a predetermined time even when the interest packet is additionally received. According to the present disclosure, each router may transmit as many the interest packets of the same content name as the number of interfaces capable of transmitting based on tree information for communication. Then, when a content source transmits a data packet, the data packet corresponding to the interest packet is delivered reversely to a path through which the interest packet passed. As illustrated in FIGS. 5A-5C, according to the modified interest aggregation scheme, the data packet is delivered to both of the first requester (Requester A) and the second requester (Request B).

Hereinafter, referring again to S350 to S380 in FIG. 3, a process in which the user node requests and receives content according to the embodiment of the present disclosure will be exemplified. First, in S350, the user node transmits an interest packet including a content name of content to be requested to the CCN router. The CCN router that has received the interest packet adds an interface in which the interest packet is received to a reception interface list corresponding to the content name in PIT. In S360, the CCN router determines whether the interest packet is transmitted based on a transmission interface list corresponding to the content name. According to the embodiment, when there is an interface that is not included in the transmission interface list out of interfaces capable of transmitting the interest packet, the CCN router may determine the interest packet to be transmitted.

More specifically, first, the CCN router checks an interface list connected to the share tree. For example, the CCN router may check the interface list connected to the share tree based on information stored in the PAFIB. The CCN router compares interfaces connected to the share tree, other than the incoming interface in which the interest packet is received, with the transmission interface list. Based on a comparison result, when there is an interface from which the interest packet is not transmitted, the CCN router determines the interest packet to be transmitted.

In S370, when the CCN router transmits the interest packet, the interface from which the interest packet is transmitted is added to the transmission interface list corresponding to the content name. On the other hand, when all interfaces connected to the share tree in the CCN router are already added to the transmission interface list, the CCN router may determine the interest packet not to be transmitted. For example, when all interfaces connected to the share tree in the CCN router are already added to the transmission interface list, the CCN router may not transmit the received interest packet to neighboring nodes and discard.

When the requested content is found in a CCN network, the data packet is delivered reversely to a path through which the interest packet passed and a copy thereof is left in caches of all passed CCN routers. In S380, when the CCN router receives the requested content, the received content is transmitted through all interfaces that are present in the reception interface list of the PIT. Then, when the interest packet for the content having a copy thereof in the cache is received, the CCN router may immediately transmit the stored data packet. That is, an initial request for the content is forwarded along the tree to all users but a copy of popular content is left in a plurality of CCN routers and thus it is possible to quickly distribute the content locally.

FIGS. 6A-6D are diagrams illustrating an example of a peer-to-peer communication method in a CCN environment according to another embodiment of the present disclosure.

FIG. 6A illustrates a condition in which a join message described in FIG. 3 is transmitted and a share tree is generated around a rendezvous point (RP). In P2P communication, the letter "P" refers to a user node that requests content data and can provide content data. The letter "R" refers to a CCN router. In FIG. 6A, all users who want peer-to-peer communication join a communication network. In this case, an entry having an application level name or having a service level name such as "/app.com" is generated in an FIB (or PAFIB) of the CCN router configuring a corresponding tree.

Single content is divided into a plurality of chunks of a small unit and the content name differs for each chunk level. In FIG. 6B, data of "/app.com/moive1/chunkNum=i" is initially requested. "/app.com/moive1" corresponds to a content level name and "/app.com/moive1/chunkNum=i" corresponds to a chunk level name of corresponding content.

FIG. 6B illustrates a process of transmitting, by a user node P1, a content request message. In this case, the content request message includes a time-to-live (TTL) value. The TTL value serves as a reference that is used to determine whether the CCN router transmits a corresponding content request message in the share tree. An initial user node may set and transmit the TTL value.

As illustrated in FIG. 6B, P1 transmits a message (interest packet) for requesting content in a phase of searching for content (in a discovery phase). P1 sets the TTL to 4 and transmits the TTL. Since the TTL value is more than 1, R2 that has received first the TTL value reduces the TTL value by 1 and transmits a content request message (TTL=3) to a next node. R1 reduces the TTL value by 1 and transmits a content request message (TTL=2) to next nodes R3 and R9. Then, until the TTL value becomes 0 or P2 having corresponding content is found, the content request message is transmitted. In R4, the content request message is transmitted to P3 and R5. However, since the TTL value of the received content request message is 0 in P3 and R5, the content request message is not delivered anymore.

Meanwhile, when response data is not received within a certain time after the user node (user) transmits the content request message, the user node may re-transmit the message by increasing the TTL value. As the TTL value, a small value (for example, 1) is initially used to search for the content in a local network. As the TTL value increases (for example, increase by 1 or two times), the corresponding content may be found in a broader network. When the response data is not received within a certain time after the user transmits the content request message, the TTL value may be increased by a reference value and re-transmitted. In this case, the reference value may be changed depending on user setting or a network system condition.

FIG. 6C illustrates a condition in which content data is transmitted according to the content request message. When requested data is received and an entry of "content level name" is not yet provided, the CCN router determines that an initial response for corresponding content is received and adds a content level name entry. Interface information in which data is received first is recorded in a corresponding entry. That is, when the content request message is delivered from a plurality of nodes, only the first delivered path may be stored. As illustrated in FIG. 6C, content data is delivered from P3 and content data is also delivered from P2. When it is assumed that the content data is delivered first from P2 having a short path, R2 stores the content name in the FIB (or in the PAFIB) entry.

FIG. 6D illustrates a condition in which an i-th chunk is received and then an (i+1)-th chunk is requested in FIG. 6C. In this case, the content level name is included in the CCN router and a path from which corresponding content data is delivered first is stored in the interface. Accordingly, the content request message for requesting the (i+1)-th chunk is delivered along only a path of P1→R2→R1→R9→P2.

That is, when the content request message is received, the CCN router searches the FIB (or the PAFIB) entry. When the content level name is found, the CCN router does not flood anymore and transmits the request message to an interface recorded in the entry.

Further, it is preferable that the content level name not used for a certain time be deleted so as not to increase the number of FIB (or the PAFIB) entry. For example, when all pieces of corresponding content data are received, it is preferable that the router, that stores the content level name (content name), delete a corresponding content name in its own entry. This is performed to prevent a problem of a decrease in a performance rate such as longest prefix matching when FIB entry information becomes large. The exemplary embodiments of the present disclosure may have effects including the following advantages. However, the embodiments of the disclosed technology may not include all of the effects and it should be understood that the spirit and scope of the disclosed technology is not limited to the embodiments.

According to the present disclosure, it is possible to perform efficient peer-to-peer communication in the CCN environment. According to the embodiment of the present disclosure, a share tree is configured among users who dynamically join in or depart from the network. Information is shared along the share tree and thus it is possible to perform efficient communication without a separate server that manages a content name and location information. In the present disclosure, the CCN router that has received the interest packet distributes the packet to the nearby. Therefore, it is possible to address a traffic concentration phenomenon occurring when the interest packet is transmitted to a server or a rendezvous point (RP) in the related art and the server or the RP distributes all interest packets. In addition, in the present disclosure, without passing the server or the RP, the CCN router directly connected to the user node that requests content starts to distribute the interest packet, and the content is transmitted reversely to a path from which the interest packet is delivered when corresponding content is found. Therefore, it is possible to receive the content from the nearest location even when the same content is present in a plurality of servers or a network cache. In addition, according to the embodiment of the present disclosure, when peer-to-peer communication is applied as a conventional Internet peer-to-peer overlay method, the content name includes a network prefix in which each user is located. Accordingly, there is a problem in that even the same content has a different content name. In addition, it is possible to perform rapid and efficient communication by compensating a problem occurring when interest aggregation is applied to the communication method according to the present disclosure.

According to the above advantages, it is possible to provide a rapid service for users in a peer-to-peer communication model in the CCN and to reduce a bandwidth usage for a network operator.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A peer-to-peer communication method in a content centric network (hereinafter referred to as a "CCN") environment, comprising:
    transmitting, by a user node to a CCN router from among user nodes and CCN routers, a join message comprising a desired service name, wherein the CCN router is directly connected with the user node;
    transmitting, by the CCN router to a rendezvous point mapped to the service name, the join message;
    forming, by all user nodes and all CCN routers which the join message traverses from among the user nodes and the CCN routers, a share tree which is rooted at the rendezvous point;
    transmitting, by the user node to the CCN router which is directly connected to the user node, a content request message comprising a name of content;
    forwarding, by one of the CCN routers in the share tree, the content request message to at least one interface connected to the share tree in response to the at least one interface not being included in a transmission interface list;
    receiving, by a node which holds the requested content in the share tree, the content request message, wherein the node comprises another user node or another one of the CCN routers in the share tree; and
    transmitting, by the node, the content to the user node, along the reverse path of the content request message through the share tree.

2. The method according to claim 1, further comprising generating, by the user node, a content name by combining the service name and a file name.

3. The method according to claim 1, wherein:
    the forwarding the content request message further comprises adding, by the one of the CCN routers that forwarded the content request message, interface information from which the content request message is transmitted to the transmission interface list corresponding to the content; and
    the one of the CCN routers that forwarded the content request message determines an interface from which the content request message will be transmitted out of interfaces connected to the share tree based on interface information included in the transmission interface list.

4. The method according to claim 1, wherein the forwarding the content request message further comprises:
    adding, by the one of the CCN routers that forwarded the content request message, interface information in which the content request message is received to a reception interface list corresponding to the content name; and
    transmitting, by the one of the CCN routers that forwarded the content request message, content data through an interface comprised in the reception interface list in response to the content data corresponding to the content name being received.

5. The method according to claim 1, wherein, in the forwarding the content request message, in response to content data corresponding to the content name not being stored in the CCN routers, and the content request message is transmitted.

6. The method according to claim 1, wherein the content request message includes a time-to-live (TTL) value, and
    in the forwarding the content request message, in response to the TTL value being more than 1, the one of the CCN routers that forwarded the content request message reduces the TTL value by 1 and transmits the content request message, and in response to the TTL value being 0, the content request message is not transmitted anymore.

7. The method according to claim 6, wherein the transmitting the content request message further comprises, in response to the user node not receiving a response for the content request message within a reference time, transmitting, by the user node, a content request message having the TTL value increased by a reference value is received again.

8. The method according to claim 1, wherein the transmitting the content further comprises, in response to a CCN router in the reverse path of the content request message receiving the content data and the content name is not present in a forwarding information base (FIB) of the CCN router, the content name is added in the FIB.

9. The method according to claim 8, wherein the transmitting the content further comprises, in response to a CCN router in the reverse path of the content request message being requested for a next chunk for content data of the content name stored in the FIB, forwarding, by the one of the CCN routers that forwarded the content request message, the content request message to an interface from which a previous chunk of the content data is received first in the transmitting of the content request message.

10. The method according to claim 8, wherein, in the transmitting the content, the CCN router in the reverse path of the content request message deletes the content name in the FIB in response to all pieces of the content data being received.

11. A content request message routing method in a content centric network (hereinafter referred to as a "CCN") environment, comprising:
   receiving, by a CCN router and from a first interface, a content request message comprising a desired content name from a user node;
   determining, by the CNN router, whether the CCN router transmits the content request message to a second interface based on a transmission interface list in a Pending Interest Table (PIT);
   adding, by the CCN router, the content name and the second interface to a transmission interface list, wherein the transmission interface list does not include the second interface;
   not transmitting, by the CCN router, the content request message in response to all interfaces capable of transmitting the content request message being included in the transmission interface list; and
   transmitting, by the CCN router, the content request message to the second interface in response to the second interface not being included in the transmission interface list.

12. The method according to claim 11, further comprising generating, by the user node, a content name by combining the service name and a file name.

13. The method according to claim 11, further comprising:
   transmitting, by the CNN router, the content request message to the second interface,
   wherein the content request message has not previously been received by the second interface.

14. The method according to claim 11, further comprising:
   adding, by the CCN router, the first interface to a reception interface list corresponding to the content name; and
   transmitting, by the CCN router, content data through an interface included in the reception interface list in response to the content data corresponding to the content name being received.

* * * * *